(12) United States Patent
Neervoort et al.

(10) Patent No.: US 8,038,532 B2
(45) Date of Patent: Oct. 18, 2011

(54) PERFORMING A COMPETITION BETWEEN TEAMS BY MEANS OF MODULAR UNITS

(75) Inventors: Paul Neervoort, Eindhoven (NL); Robert Kortenoeven, Milan (IT)

(73) Assignee: Koninklijke Philips Electronics N.V., Eindhoven (NL)

( * ) Notice: Subject to any disclaimer, the term of this patent is extended or adjusted under 35 U.S.C. 154(b) by 1180 days.

(21) Appl. No.: 10/521,862

(22) PCT Filed: Jul. 16, 2003

(86) PCT No.: PCT/IB03/03241
§ 371 (c)(1),
(2), (4) Date: Jan. 21, 2005

(87) PCT Pub. No.: WO2004/009198
PCT Pub. Date: Jan. 29, 2004

(65) Prior Publication Data
US 2005/0288100 A1 Dec. 29, 2005

(30) Foreign Application Priority Data
Jul. 24, 2002 (EP) .................................. 02078012
Sep. 9, 2002 (EP) .................................. 02078664

(51) Int. Cl.
*A63F 13/10* (2006.01)
*A63F 13/12* (2006.01)
(52) U.S. Cl. ........................................... 463/39; 463/40
(58) Field of Classification Search .............. 463/39–42, 463/2–6; 273/237, 238, 239, 447, 448, 454, 273/455, 460
See application file for complete search history.

(56) References Cited

U.S. PATENT DOCUMENTS

| 4,337,948 A | * | 7/1982 | Breslow et al. ............... 273/237 |
| 4,372,558 A | | 2/1983 | Shimamoto et al. |
| 4,938,483 A | * | 7/1990 | Yavetz ............................. 463/5 |
| 5,184,830 A | * | 2/1993 | Okada et al. .................... 463/29 |

(Continued)

FOREIGN PATENT DOCUMENTS

JP   2001129260 A   5/2001

(Continued)

*Primary Examiner* — David L Lewis
*Assistant Examiner* — Matthew D. Hoel (57) ABSTRACT

This invention relates to a method of performing a competition between teams by means of at least two sets of modular units (20A, 20B; 21A, 21B; 22A, 22B). The invention further relates to a modular unit for performing a competition between teams. Said method comprises the steps of connecting a first set of modular units (20A, 21A, 22A) to a second set of modular units (20B, 21B, 22B), wherein each set comprises at least one modular unit (10); determining which first modular unit in the first set is connected to which second modular unit or units in the first set; determining which third modular unit in the second set is connected to which fourth modular unit or units in the second set; determining a set of information items for at least one modular unit, wherein each information item individually relates to a specific modular unit in said sets (20A, 20B; 21A, 21B; 22A, 22B); and wherein said set of information items represents competition-related information, and wherein said set of information items depends on the way in which said modular units are located relative to one another, a property for each modular unit and of which first competition performed; distributing the set of information items to the corresponding modular units; and presenting said set of information items on the modular units. A modular unit, when used in conjunction with more modular units, can thus provide a freely selectable field of any form or shape for performing a competition, such as sports or games.

20 Claims, 5 Drawing Sheets

U.S. PATENT DOCUMENTS

| | | | |
|---|---|---|---|
| 5,396,225 A * | 3/1995 | Okada et al. | 463/40 |
| 5,428,528 A * | 6/1995 | Takenouchi et al. | 463/42 |
| 5,618,045 A * | 4/1997 | Kagan et al. | 463/40 |
| 5,691,885 A * | 11/1997 | Ward et al. | 361/735 |
| 5,702,305 A * | 12/1997 | Norman et al. | 463/42 |
| 5,738,583 A * | 4/1998 | Comas et al. | 463/40 |
| 5,966,526 A * | 10/1999 | Yokoi | 703/11 |
| 6,165,068 A | 12/2000 | Sonoda et al. | |
| 6,254,481 B1 | 7/2001 | Jaffe | |
| 6,287,200 B1 * | 9/2001 | Sharma | 463/40 |
| 6,292,198 B1 * | 9/2001 | Matsuda et al. | 345/473 |
| 6,354,946 B1 * | 3/2002 | Finn | 463/40 |
| 6,383,075 B1 * | 5/2002 | Jeong et al. | 463/39 |
| 6,443,796 B1 * | 9/2002 | Shackelford | 446/91 |
| 6,500,070 B1 * | 12/2002 | Tomizawa et al. | 463/43 |
| 6,524,189 B1 * | 2/2003 | Rautila | 463/40 |
| 6,540,606 B1 * | 4/2003 | Matsukata | 463/1 |
| 6,540,614 B1 * | 4/2003 | Nishino et al. | 463/40 |
| 6,554,712 B1 | 4/2003 | Takahashi | |
| 6,561,809 B1 * | 5/2003 | Lynch et al. | 434/16 |
| 6,585,597 B2 * | 7/2003 | Finn | 463/40 |
| 6,626,756 B2 * | 9/2003 | Sugimoto | 463/4 |
| 6,659,860 B1 * | 12/2003 | Yamamoto et al. | 463/1 |
| 6,674,995 B1 * | 1/2004 | Meyers et al. | 455/41.2 |
| 6,687,128 B2 * | 2/2004 | Tokuhara | 361/724 |
| 6,795,318 B2 * | 9/2004 | Haas et al. | 361/729 |
| 6,811,487 B2 * | 11/2004 | Sengoku | 463/42 |
| 7,179,171 B2 * | 2/2007 | Forlines et al. | 463/41 |
| 7,184,718 B2 * | 2/2007 | Newman et al. | 455/90.3 |
| 7,233,988 B2 * | 6/2007 | Minakuchi et al. | 709/224 |
| 7,371,177 B2 * | 5/2008 | Ellis et al. | 463/42 |
| 2001/0044339 A1 * | 11/2001 | Cordero et al. | 463/42 |
| 2002/0006825 A1 * | 1/2002 | Suzuki | 463/40 |

FOREIGN PATENT DOCUMENTS

| | | |
|---|---|---|
| JP | 2001224865 A | 8/2001 |
| WO | WO01/65358 A2 | 9/2001 |
| WO | WO01/65358 A3 | 9/2001 |

* cited by examiner

PERFORMING A COMPETITION BETWEEN TEAMS BY MEANS OF MODULAR UNITS

This invention relates to a method of performing a competition between teams by means of at least two sets of modular units.

The present invention also relates to a computer system for performing the method.

The present invention further relates to a computer program product for performing the method.

This invention further relates to a modular unit for performing a competition between teams by means of at least two sets of modular units.

U.S. Pat. No. 6,165,068 discloses a game-fighting machine. It can be interconnected to a counterpart game-fighting machine by means of a plug mechanism. These game-fighting machines may be used as two game opponents in a game fight. The game fight may then be controlled by two players who are using said game as entertainment.

It is a problem that modular units—e.g. as used in the above-mentioned prior art—are not flexible in size and can only be positioned in predetermined fixed positions relative to each other.

Correspondingly, it is a problem that a playfield (i.e. an area in which a game or sports may take place) comprised by connected modular units is limited to a fixed form and thus limited to a predetermined team set-up.

It is a further problem that a modular unit, e.g. a portable game console, cannot have its displayable area expanded while in operation.

It is therefore an object of the invention to provide a modular unit that, when used in conjunction with more modular units, can provide a freely selectable resulting shape.

It is therefore a further object of the invention to provide a modular unit that, when used in conjunction with other modular units, may provide a playfield of any form or shape with a corresponding team set-up.

Finally, it is an object of the invention to provide a modular unit with an expandable display area that is expandable during a play, a game or a sports competition.

The objects are achieved by a method of the type mentioned, the method comprising the steps of:
  connecting a first set of modular units to a second set of modular units, wherein each set comprises at least one modular unit;
  determining which first modular unit in the first set is connected to which second modular unit or units in the first set;
  determining which third modular unit in the second set is connected to which fourth modular unit or units in the second set;
  determining a set of information items for at least one modular unit, wherein each information item individually relates to a specific modular unit in said sets; and wherein said set of information items represents competition-related information, and wherein said set of information items depends on the way in which said modular units are located relative to one another, and/or a property for each modular unit and/or which first competition is performed;
  distributing the set of information items to the corresponding modular units; and
  presenting said set of information items on the modular units.

In the first step, two players may connect each of their teams (comprised of modular units) to each other to define a playfield with corresponding sports figures or game pieces.

The object of providing a playfield of any form or shape with a corresponding team set-up by means a modular units is thereby achieved, since the modular units—when used in conjunction with other modular units—can be freely connected to one another and since each of these may be configured in various shapes, such as rectangular, circular, triangular, elliptic, etc.

In the second and third steps, locations of modular units in corresponding sets, i.e. teams, are determined, thus how the physical layout of each of the two sets of modular units is determined, i.e. the layout in each of two teams. This layout may define the physical playing field for a game, sports, etc.

In the fourth step, a set of information items for a later presentation of each of the modular units in said sets is determined. The set of information items may represent presentable competition-related information, and depends on the way in which said modular units are located relative to one another in said sets or teams. Furthermore, said set of information items may depend on a property relating to each modular unit and on which first competition is performed.

The property may relate to a soccer player and relating to a specific modular unit. Said property may comprise how many goals said soccer player has scored, number of yellow and red cards received, penalties, relative strength, preferred role or position, age, appearance, name, sex, etc.

The information item may comprise plain text, pictures, frames, video, word-processor data, spread-sheet data, game figures, game or sports elements, text or picture messages, speech, commands and combinations thereof relevant to the competition performed.

Said first competition performed may be any game, game of sports, or play, such as American football, double, mixed or single tennis, double, mixed or single badminton, volleyball, basketball, curling, handball, ice-hockey, hockey, cycling such as opposing teams in the Tour de France, go-cart, Formula 1 Race, etc.

In a preferred embodiment of the invention, a game—as an example of said first competition in the world of sports—may be performed between two teams.

The invention may be further applied to board games (defined and performed by means of interconnected modular units)—as another example of said first competition. These may comprise Monopoly, Trivial Pursuit, Chess, Ludo, Parcheesi, Nine Men's Morris, Draughts, Checkers, Settlers, strategy games, Roulet, Bridge, Whist, Black Jack, or Poker, etc.

In the fifth step, each modular unit may currently have its specific information item provided for a subsequent presentation in the next step.

Finally, the information is presented, i.e. displayed and/or played back, if possible on the modular units. Since they may comprise a physical playing field for a game, the combined presentation from said modular units will appear on one large display.

In a preferred embodiment of the invention, the method further comprises the step of:
  receiving a first information item representing a property of a modular unit.

During a competition, e.g. soccer, a user may enter a new property to a modular unit instead of the old one. He may desire to set a soccer player's number of yellow cards to zero to avoid that this player—relating to his modular unit—is later forced to leave the soccer match.

Said first information item—for a soccer player—may be the number of goals scored, the number of red or yellow cards, penalties, relative strength, preferred role or position, age, appearance, name, sex, club-relation(s), etc.

In a preferred embodiment of the invention, the method further comprises the step of:

receiving a second information item representing a second competition.

In this case the user may hereby make the modular units switch to a new competition, i.e. a new game of sports, play, etc.

In a preferred embodiment of the invention, the method further comprises the steps of:

disconnecting a third set of modular units from the first and second set of modular units, wherein said third set comprises at least one modular unit, whereby the object of providing a playfield of any form or shape is achieved, because the modular units—when used in conjunction with other modular units—may also be freely disconnected from one another, thus creating a smaller modified resulting shape;

connecting a fourth set of modular units to said first and second set of modular units, wherein said fourth set comprises at least one modular unit, whereby the object of the invention to provide a modular unit with an expandable display area during play is achieved because one or more modular units may be added during a play, a game or a sports competition.

Said objects are further achieved by a modular unit for performing a competition between teams by means of at least two sets of modular units, said modular unit comprising:

means for connecting the modular unit connected in a first set of modular units to a second set of modular units, wherein said sets comprise at least one modular unit;

means for determining which modular unit is connected to which second modular unit or units in the first and the second sets;

means for determining a set of information items, wherein each information item individually relates to a specific modular unit in said sets; and wherein said set of information items represents competition-related information, and wherein said set of information items depends on the way in which said modular units are located relative to one another in said sets and/or, a property for each modular unit and/or which first competition is performed;

means for distributing the set of information items to the corresponding modular units in said sets; and means for presenting one of said information items.

In a preferred embodiment of the invention, the modular unit further comprises:

means for receiving a second information item representing a second competition.

The modular unit gives the same advantages for the same reasons as described previously in relation to the method.

The invention will be explained more fully below in connection with preferred embodiments and with reference to the drawings, in which.

Throughout the drawings, the same reference numerals indicate similar or corresponding features, functions, etc.

Figure 1:
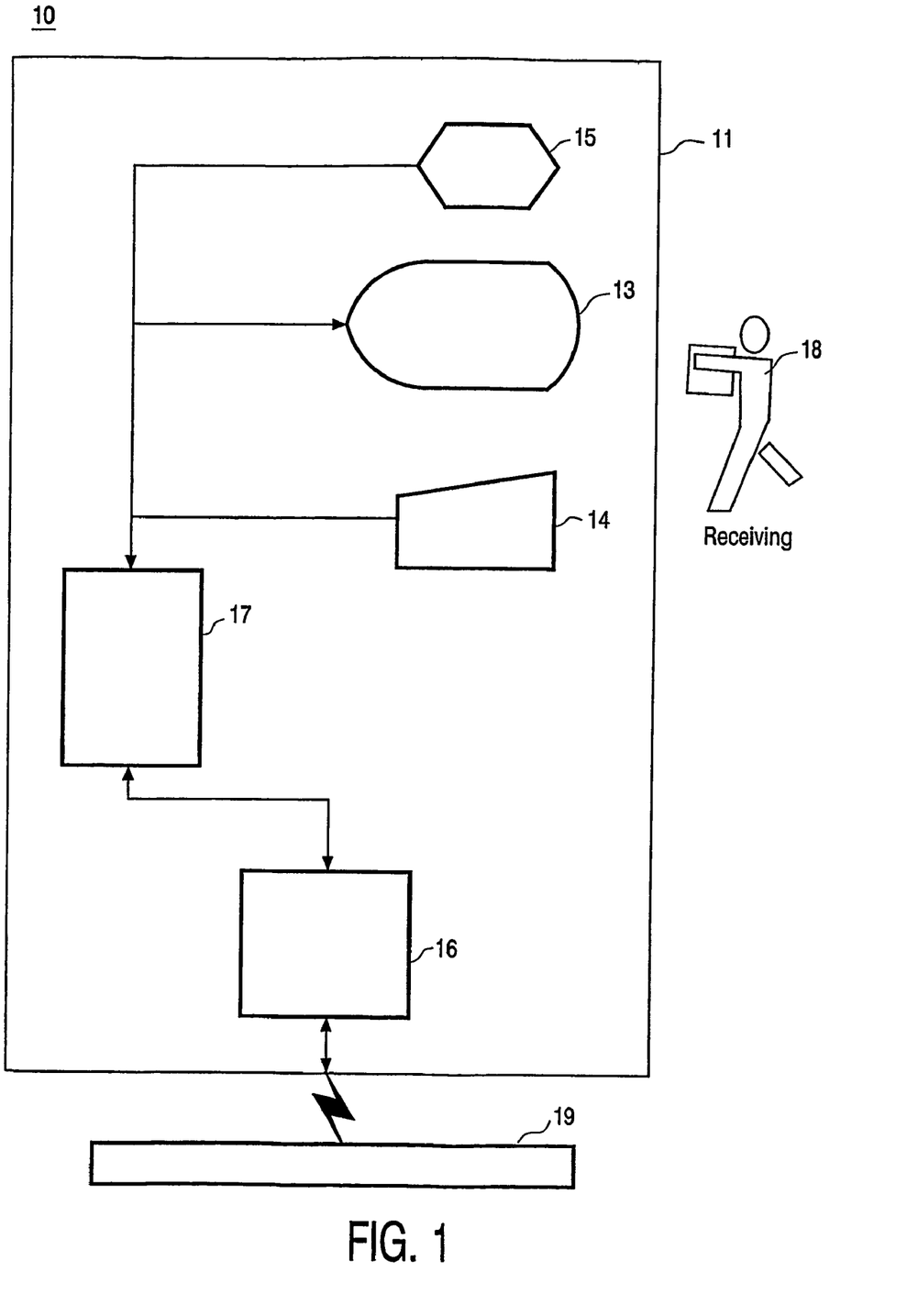
FIG. 1 shows a modular unit.

FIG. 1 shows a modular unit. The modular unit as denoted by reference numeral 10 has a front as denoted by reference numeral 11. Close to said front, a user—as indicated by reference numeral 18—may obtain information from the modular unit's display 13, and/or from a loudspeaker 15, each positioned on the front.

Said information may be displayed on the display and said information, when it comprises sounds or music, may optionally or additionally be emitted by means of the loudspeaker 15 or on a like device. The modular unit may be used and operated in conjunction with connections to other modular units grouped together, e.g. in teams with the intention to provide the user with an enlarged viewing area of a common playfield, i.e. an area in which a game or a sports competition may take place. In other words, the modular unit may preferably be connected to other units of the same kind.

Neighbouring modular units may be detected through an electronic circuit. Every modular unit may send an electronic signal to its ports and if another modular unit is connected to a port, a closed circuit results. The processor in the modular unit may use the returning electronic signal from the port to detect the closed circuit. The processor may then know that another modular unit is connected to that specific port. Each port may comprise 2 points: a sending point and a receiving point. The modular unit may be based on a handshake protocol, which means that as soon as two modular units are connected to each other, the connection enables the electronic signal to run through a closed circuit. The connected modular unit operates in a similar way as clustered computing, which means that each modular unit is equal in its role of processing data, i.e. no server component needs to be present, and the modular units together operate as one system, e.g. as a module of modular units. As will be discussed hereinafter, said system may comprise and operate as one enlarged display.

When the location of the modular unit is known, information—reflecting said location—may subsequently be determined and transferred to the modular unit for a subsequent presentation.

Said game information may be plain text, pictures, frames, video, word-processor data, game figures, game or sport elements, text or picture messages, and combinations thereof.

The user may respond to said game information given by means of an input device—still referring to the modular unit—denoted by reference numeral 14. As an example, before or during a particular sports game or other competition said user may wish to change from one game currently being played to another game to be played subsequently. Accordingly, a modular unit or units may then present different information reflecting the new game or competition. The user may respond to said information by means of an input device as denoted by reference numeral 14. The input device may be a keyboard, some other pushbutton and/or fields sensitive to touch on said display. The input device may further be a button and/or an arrangement of buttons, a pointing device, such as a mouse, a trackball, a touch pad, a digital pen, or the like.

By means of the processor said information may be displayed and/or played back or redirected to other modular units. The modular unit may be connected physically by means of a connector 19, or logically by means of an identifier to other or different modular units. It may therefore be appropriate that information dedicated to one modular unit may be transferred through another modular unit by means of a communication device 16, connected to a processor 17. The communication device may receive or send information by means of a network, e.g. a local area network (LAN), a wide area network (WAN), or any combination thereof e.g. the Internet, an intranet, an extranet. The network may comprise wired and wireless communication links. Said network may be a general solution known from the prior art, or it may be dedicated to an optimized communication between said modular units. The communication device may communicate by means of said connector.

The user may be able to update the contents of a modular unit by connecting it to a personal computer or to a base station in a toystore. The team player information on a modular unit could, for instance, contain information on the amount of goals scored by a soccer player.

In order to be compatible with personal computers, an update 'docking' station may be used to enable users to connect their modular units to the personal computer. A small USB module could be a part of said communication device to allow said connection with the personal computer or the base station.

Said processor is arranged to receive inputs from the display if it has touch-sensitive fields on its front, the input device and the communication device. The processor is further arranged to generate display data to the display, sound or music data to the speaker, location of a module or a neighbouring module or modules and other data to the communication device.

Figure 2:
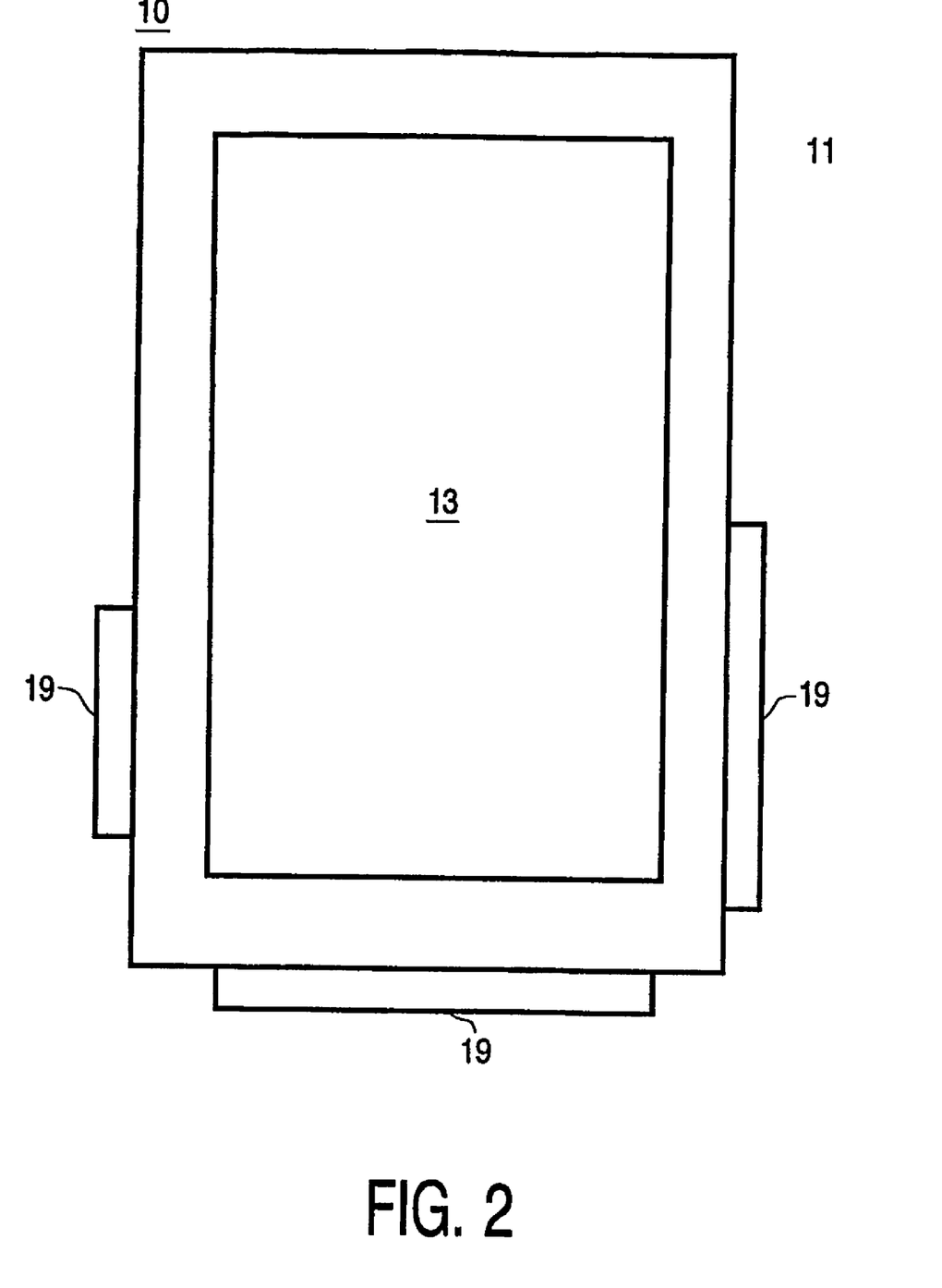
FIG. 2 shows a physical implementation of the modular unit.

FIG. 2 shows a physical implementation of the modular unit. In a preferred embodiment, the display area, i.e. the modular unit's display is large compared to the physical layout of the modular unit. More layouts will be shown in the next Figure. Since it may be possible to connect the modular unit to other modular units, the physical layout of said connector may be of interest to the player.

Figure 3:
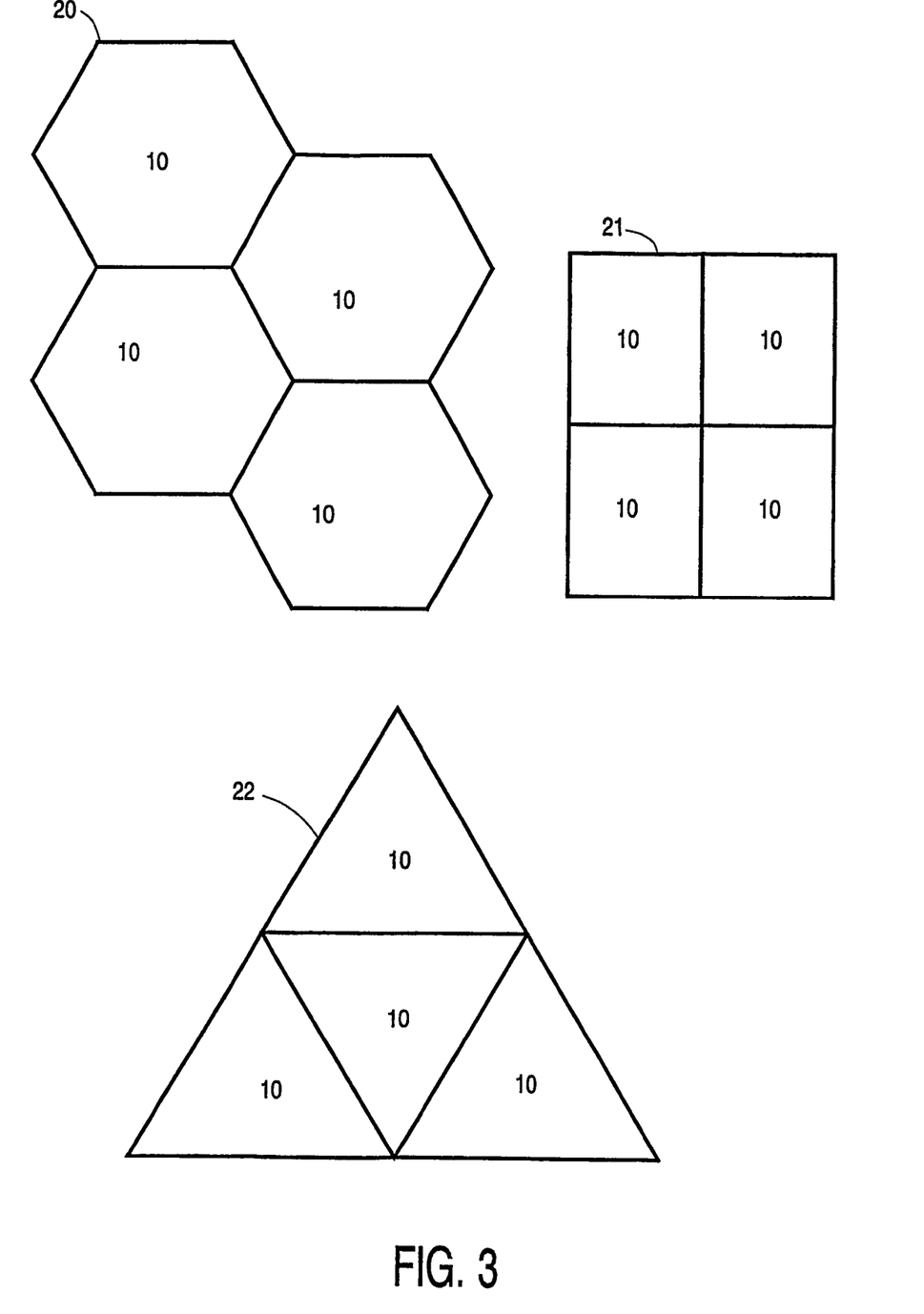
FIG. 3 shows various connection configurations of modular units.

FIG. 3 shows various connection configurations of modular units. Also in this case, in a preferred embodiment of the invention, the display area, i.e. the modular unit's display may be large compared to the shown physical layouts of the modular units. Reference numerals 20, 21 and 22 show in which way modular units 10 may be connected to one another. Reference numeral 20 shows modular units in hexagonal layouts connected to one another, reference numeral 21 shows modular units in rectangular layouts connected to one another, and correspondingly, reference numeral 22 shows modular units in triangular layouts. These various groupings of modular units allow an easy design of any larger display shape comprised by the display area of each of the connected modular units. The entire playfield of a game may thereby be shown by means of many connected modular units. The grouping may take place with a minimized loss of interconnection space due to the three shown layouts. Two, or more than three modular units may be connected to one another, or to modular units of other kinds. It may further be possible to have the modular unit configured in other shapes, such as circular, elliptic, etc.

As shown in the Figure, it may provide a maximized display area to connect one triangular layout to another triangular layout, one rectangular layout to another rectangular layout, etc. However, any unlike layouts of modular units can be combined.

Generally, a number of interconnected modular units, in total, may comprise a physical area of a game or a team, i.e. the previously mentioned playfield. As an example, the four modular units in reference numerals 20, 21 and 22, respectively, could be three different teams.

Figure 4:
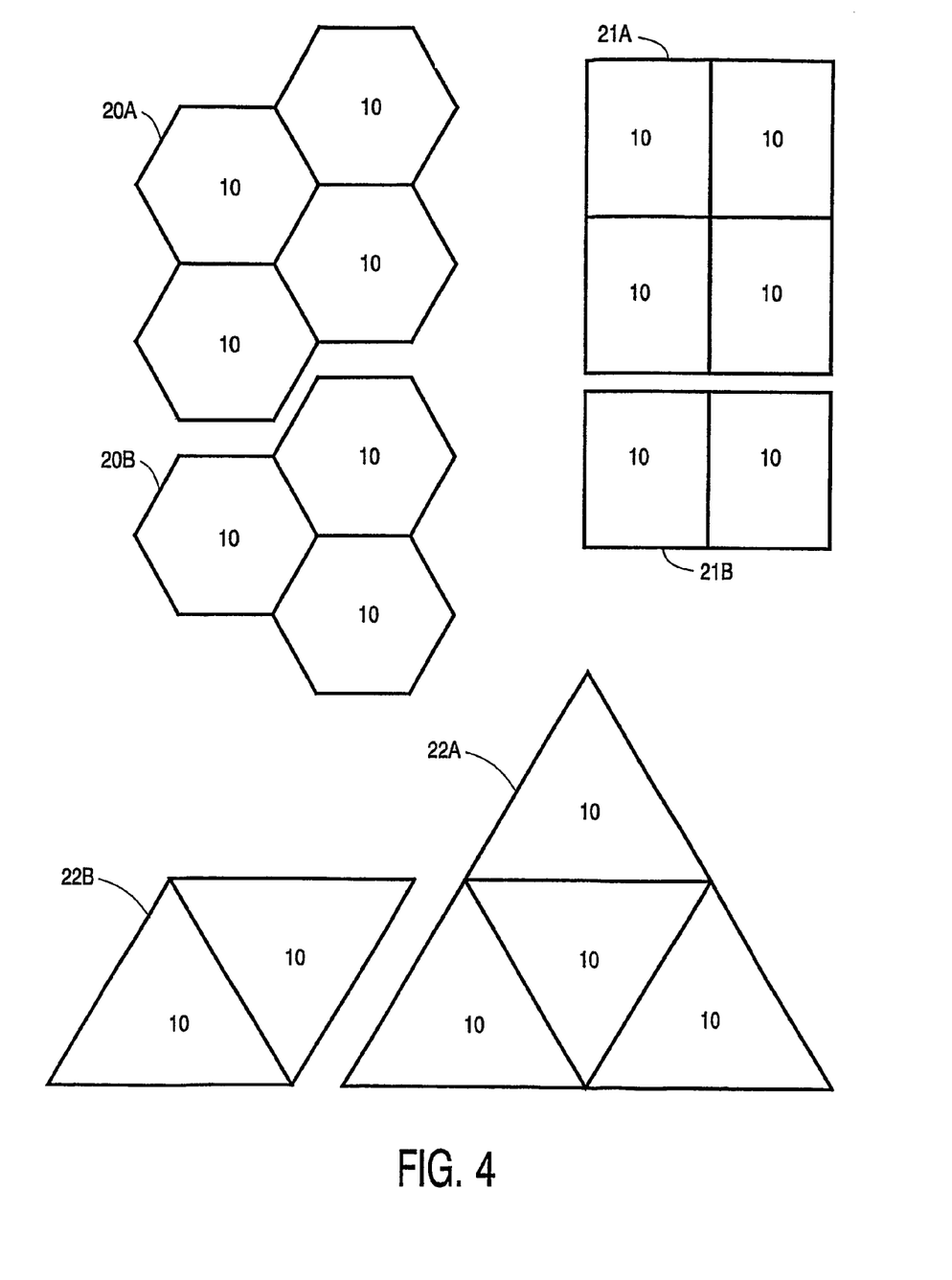
FIG. 4 shows two sets of modular units used as two teams in a game of sports or play.

FIG. 4 shows two sets of modular units used as two teams in a game of sports or play. Reference numerals 20A and 20B, 21A and 21B, and 22A and 22B, respectively show how two sets of modules of modular units 10 may connect to one another. When connected, the combined modules will be reference numerals 20A and 20B as a first field of a (sports) game, reference numerals 21A and 21B as a second field, and reference numerals 22A and 22B as a third field of a game, respectively.

Reference numerals 20A+20B show the new field or playfield of the game comprised of hexagonal layouts, reference numerals 21A+20B show another playfield of the game comprised of rectangular layouts, etc. These new modules of modular units allow a combined, enlarged display shape, which can be used to show the game like the playfield of a real game. It may further be possible to connect unlike-shaped modules and unlike shaped modular units to one another.

In other words, by using of a number of interconnected modular units, an enlarged display or screen is created. Consequently, this may be used as a presented playfield for two competing teams.

The possibility of arranging modular units in a special configuration, i.e. as teams, enables the game or competition user to make software-based adjustments to manipulate the settings, shape and performance of a team in, for example, a sports game. The modular unit may have small LCD screens as displays allowing two users to plug-in their 'team module' and then perform a competition between said modules by means of these, i.e. to watch a match between their respective teams. Each team or 'team module' may comprise multiple modular units capable of displaying, playing back, storing and retrieving data. Each of said units may be updated through an online connection by means of said communication device of FIG. 1. As a result, a modular unit may then contain the latest information on its team player.

The modular units may be small handheld modules that allow the user to play and watch a match between different modules. Each of the modules—each comprising a number of modular units—can be updated via an online connection. The user of one module, i.e. one set of modular units, can thereby play or manage a sports match of his team against another person having another module with another team, i.e. another set of modular units. Said modules may also enable the users to define team player positions within the match. The match may be 'semi-interactive', which means that users can adjust team characteristics and game settings before and during the match.

As an example, in a sports game between two soccer teams, each team may comprise eleven players, i.e. eleven modular units, each representing an individual team player. As a consequence, the sum of two times eleven connected modular units can be used to present the soccer game.

Correspondingly, other games or sports between two teams may be played or performed by means of and on two sets of modular units. These may be a sports game, such as American football, double, mixed or single tennis, double, mixed or single badminton, volleyball, basketball, curling, handball, ice-hockey, hockey, cycling such as opposing teams in the Tour de France, go-cart, Formula 1 Race, etc.

The game rules of combat or rules in sports may be supervised by one or more modular units dedicated to that purpose.

A game in the world of sports between two teams is a typical field of the invention. However, by adding a third team or group to two teams or groups, a sports game between three teams may also be an option. Correspondingly, a sports game between more than three teams may also apply.

It may further be possible to apply the invention to board games, such as Monopoly, Trivial Pursuit, Chess, Ludo, Parcheesi, Nine Men's Morris, Draughts, Checkers, Settlers, strategy games, Roulet, etc. Other games with a corresponding game board may be card games, such as Bridge, Whist, Black Jack, Poker, etc.

In such games or sports, the displays of the combined modular units—used as game elements or items—may comprise the corresponding game boards or playing field in said games or sports.

Throughout the application—when the wording "presentation", "present" or the like is used—it is intended to designate that competition content may be displayed on a corresponding display of the modular unit. And, furthermore—in case that competition content is suitable for emission through a loudspeaker, i.e. when said competition content comprises sounds and/or music—competition content is also played back. This is possible because said modular unit may comprise a loudspeaker or a like device.

The wording "competition content" is understood to be information displayed and or played back relating to a sports game, a play or game as discussed above. Said information or competition content may be plain text, pictures, frames, video, word-processor data, spread-sheet data, game figures, game or sports elements, text or picture messages, speech, commands and combinations thereof.

The shape of combined modular units (e.g. two or more teams) may be a playing field for different games or sports. Examples of these could be American football, double, mixed or single tennis, double, mixed or single badminton, volleyball, basketball, curling, handball, ice-hockey, hockey, cycling such as opposing teams in the Tour de France, go-cart, Formula 1 Race, etc.

More modular units—as discussed, the playing field—will typically define and comprise an area in which the game or sports takes place.

Figure 5:
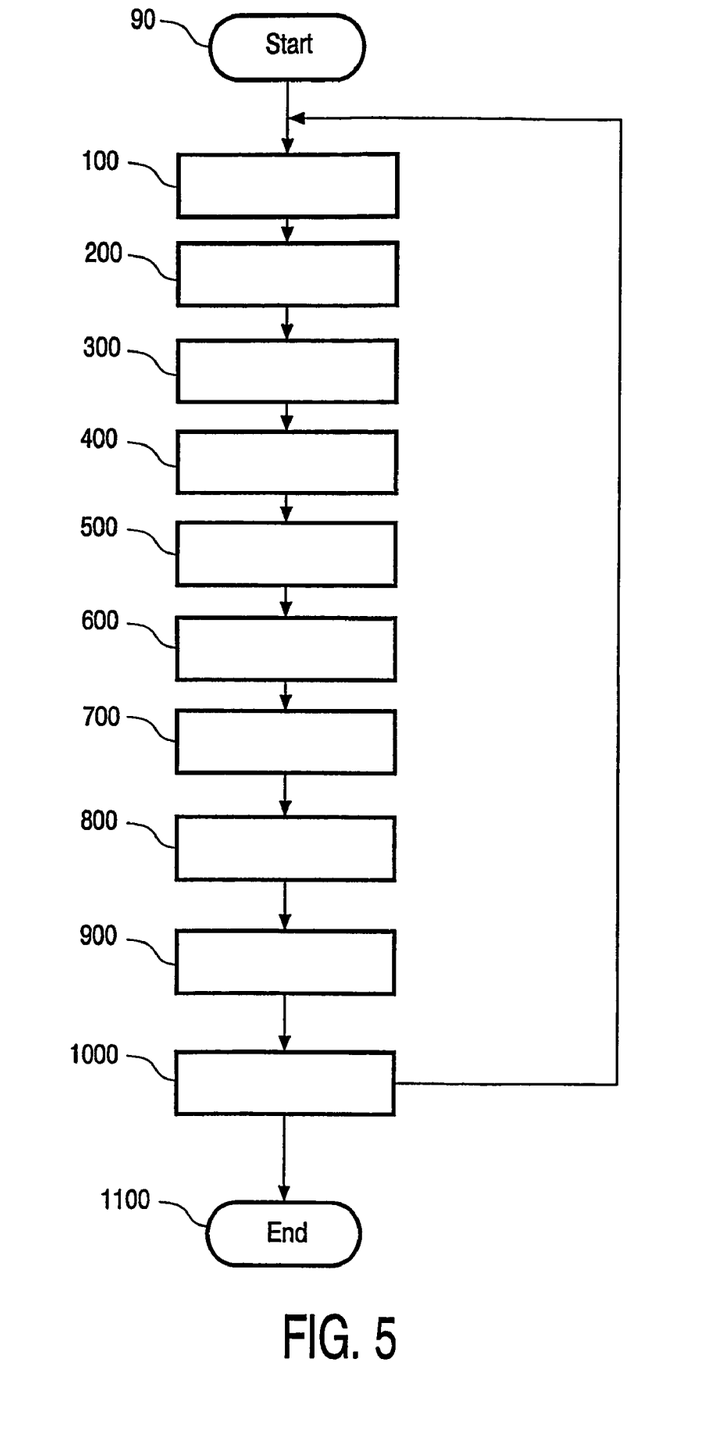
FIG. 5 show a method of performing a competition between teams by means of at least two sets of modular units.

FIG. 5 shows a method of performing a competition between teams by means of at least two sets of modular units.

In step 90, the method in accordance with a preferred embodiment of the invention is started. Variables, flags, buffers, etc., keeping track of locations, competition content, information item or items, identifying signal or signals, etc., corresponding to the status (of sets) of modular units connected relative to one another, and corresponding to the status of a given selected competition (game, sports, play) are set to default values. When the method is started a second time, only corrupted variables, flags, buffers, etc, are reset to default values.

In step 100, a first set of modular units may be connected to a second set of modular units. Each of said sets may comprise at least one modular unit.

As previously discussed, the shape of combined modular units, i.e. said first and second sets of modular units, may typically be understood as two teams using a common playing field for different games or sports. Examples of these could be American football, double, mixed or single tennis, double, mixed or single badminton, volleyball, basketball, curling, handball, ice-hockey, hockey, cycling such as opposing teams in the Tour de France, go-cart, Formula 1 Race, etc.

More modular units—as discussed, the play or playing field—will typically define and comprise an area in which the game or sports takes place. In other words, in this step, modular units may then provide a freely selectable resulting shape of the playing field.

In step 200, a modular unit may determine which first modular unit in the first set is connected to which second modular unit or units in the first set. One modular unit may have information about how the modules in the first set are connected to one another, and thus their locations relative to one another. In a sports game, the first set may comprise half of the play ground in a soccer match with corresponding soccer players of a team, e.g. Liverpool. Said relative locations relative to one another may here designate which roles and positions, i.e. the team set-up of Liverpool, the players have in this team. These may be goalkeeper, wings, back, mid-field players, etc.

In step 300, a modular unit, but here in the second set, may determine which third modular unit in the second set is connected to which fourth modular unit or units in the second set. Corresponding to the foregoing step with correspondingly determined relative locations in the same sports game, the second set may comprise the other half of the play ground in the soccer match with corresponding soccer players' roles and positions in another team set-up for e.g. Barcelona.

These two steps may be repeated until all connections, i.e. locations are determined, thus determining the physical layout of each of the two sets after they have been connected to one another (in step 100), i.e. combined into the playfield shape of a common playfield. Alternatively, these two steps may also be performed before or during said connection of teams in step 100.

The common playfield could be perceived as a simulated physical playfield in Liverpool, Barcelona, or on any other location not necessarily belonging to any of said soccer teams.

For said two steps, determination of which modular unit in a set that is connected to another modular unit or units or other modular units in another set corresponds to previously-mentioned detection of neighbouring modular units as discussed in FIG. 1.

In step 400, at least one modular unit may determine a set of information items. Each information item in this set may individually relate to a specific modular unit, and said information item may represent competition-related information, and depends on the way in which said modular units are located to one another in the combined sets or teams. Furthermore, said set of information items may depend on a property relating to each modular unit (in the combined sets or teams) and on which first competition is performed.

Each modular unit may comprise a property relating to, e.g. a soccer player, for example how many goals has the soccer player scored, number of yellow and red cards received, penalties, relative strength, preferred role or position, age, appearance, name, sex, etc.

Each information item may be plain text, pictures, frames, video, word-processor data, spread-sheet data, game figures, game or sports elements, text or picture messages, speech, commands and combinations thereof relevant to the competition performed.

Said first competition performed may be any game, game of sports, or play.

In step 500, said set of information items may be distributed to the corresponding modular units. Each modular unit may currently have its information item provided for a subsequent presentation in the next step. The distribution may take place by means of the previously mentioned connector. In order to distribute information properly and efficiently, it may be appropriate that information dedicated to one modular unit may be transferred through another modular unit by means of the previously mentioned communication device.

In step 600, said set of information items may be presented on the modular units. As previously discussed, the term present is understood to be "display" and/or "play back" content, i.e. said information item, on the modular unit.

When said modular units in the combined sets or teams present their information, it appears on, and as one large display displaying the competition performed between teams.

In step 700, a first information item representing a property of a modular unit may be received. The user may enter another property to a modular unit instead of the one currently used. He may desire to modify the number of yellow cards of a soccer player so as to avoid that—due to the number of yellow cards already received—this player is forced to leave the match later.

The received property—for a soccer player—may further be the number of goals scored, number of red cards, penalties, relative strength, preferred role or position, age, appearance, name, sex, club-relation(s), etc.

In a game of chess, the player may be a game piece with a changeable property, e.g. the property may be changed from a pawn to a king, a queen or a castle, etc; or the colour of the game piece may be changed from white to black, or vice versa, etc. Furthermore, a new property may move the game piece to another location in the game of chess.

Accordingly, the property may determine—in step 400—another set of information items subsequently to be presented on the modular units in the steps that follow step 400.

In step 800, a second information item may be received, which may represent a second competition. One of the users may enter another competition type or kind to any modular unit.

The received second information item may be any new game, game of sports, or play.

Accordingly, said second information item may determine—in step 400—a modified set of information items (reflecting the new game, etc) subsequently to be presented on the modular units in the steps that follow step 400.

In step 900, a third set of modular units may be disconnected from the first and second sets of modular units. Said third set—as is general for the sets mentioned—may comprise at least one modular unit.

In step 1000, a fourth set of modular units may be connected to the first and second sets of modular units. Said fourth set may also comprise at least one modular unit.

As discussed in step 100, and by means of said disconnection and connection in the two above mentioned steps, the shape of newly combined modular units, i.e. first, second, third, fourth sets of modular units, may redefine the area in which the game or sports takes place. In other words, in these two steps, modular units may again provide a new resulting shape of the playing field.

Usually, the method will start all over again as long as at least one modular unit is powered. Otherwise, the method may terminate in step 1100; however, when the modular unit is powered again, etc, the method may proceed from step 100. By using of the above-mentioned steps, the following example will show a possible use of the invention.

12 year-old Danny and Jack watched a soccer match last night. Together with Ben, they are discussing the match results.

They decide to replay the match, using their modular units as the two teams, i.e. step 100. Jack has just obtained a modular unit of the Brazilian soccer player Romario from a toy store, so now he may be able to create his team of 11 soccer players with Romario in the centre-forward role.

The modular unit may contain information, e.g. a property, about the soccer player, e.g. number of goals scored, number of yellow and red cards, penalties, relative strength, preferred role or position, age, appearance, etc, i.e. step 700, and may, correspondingly, show or display a visual or animated representation of that player, i.e. step 600.

Using their modular units, both Danny and Jack may then each create a team (module) of 11 soccer players. The team module for each team may be constructed by connecting said 11 modular units to one another. The modular units may have a topside and a bottom side. As an example, when the bottom side of one modular unit is connected to the topside of another modular unit, these modular units may be recognized as part of the same team module. Correspondingly, when the topside of a modular unit is connected to the topside of other modular units, these other modular units may then be recognized as part of the opposite team.

Correspondingly, steps 100, 200 and 300 will typically be performed during team creation and connection of modular units to one another.

Jack may then decide to make some changes in his team set-up and may move some soccer players, i.e. modular units, to other positions, e.g. the Brazilian soccer-player Romario may be moved from a position or role as a "centre forward" to a "left wing", etc. This corresponds to steps 900 and 1000. His relative location among the 11 modular units of his team may indicate his position or role in the team's set-up when the soccer match is started. Correspondingly, the images displayed on the modular unit may then show a slight movement to indicate a change in the team's set-up. The latter corresponds to step 600.

As soon as the two teams, i.e. two modules of modular units, have been connected to each other, the soccer match may then automatically start. As soon as the match has started, the team modules (groups of modular units) may then operate as one large display. This corresponds to step 600. The visual representations of the now 22 soccer players may move freely within the large display's screen space. During the soccer match, the users, i.e. the two team creators, may still be able to change the layout of the modular units in each of said two team modules and therefore affect the course of events taking place during said soccer match.

The modular unit may be a portable game console, a game device, an electronic playing card, a display or presentation device connectable to like devices in sets. A computer-readable medium may be a magnetic tape, an optical disc, a digital video disk (DVD), a compact disc (CD record-able or CD write-able), a mini-disc, a hard disk, a floppy disk, a smart card, a PCMCIA card, etc.

The invention claimed is:

1. A method of performing a competition between teams by means of at least two sets of modular units, the method comprising acts of:

connecting a first set of modular units to a second set of modular units, wherein each set of modular units comprises at least one modular unit;

determining a set of information items for at least one modular unit, wherein each information item individually relates to a specific modular unit in the first and second sets, wherein the set of information items represents competition-related information, wherein the determined set of information items comprises connection-related information indicating relative physical locations of each of said connected modular units relative to each other of said connected modular units;

creating a common game space including the determined set of information items based on the indication of the relative physical locations of each of said connected modular units relative to each other of said connected modular units such that the relative physical locations between the connected modular units defines a game space including a size and shape of a play field and thereby which competition is first performed; and presenting the set of information items on the connected modular units during the competition.

2. The method as claimed in claim 1, further comprising acts of:
receiving a first information item representing a property of a connected modular unit; and
setting a competition-related information item of connected modular units during the competition based on the received first information item.

3. A method according to claim 1, the method further comprising acts of:
receiving a second information item representing a second competition; and
setting a competition-related information item of connected modular units during the second competition based on the received second information item.

4. The method according to claim 1, further comprising acts of:
connecting a third modular unit to at least one of the first and second set of modular units,
receiving a third information item from the third modular unit; and
setting a competition-related information item of all connected modular units during the competition based on the received third information item.

5. The method as claimed in claim 1, wherein the competition related information includes a physical layout of the common game space during the competition.

6. The method as claimed in claim 1, wherein the competition related information includes a physical layout of players relative to one another within the common game space during the competition.

7. A computer system for performing a competition between teams by means of at least two sets of modular units, the computer system comprising:
means for connecting a first set of modular units to a second set of modular units, wherein each set of modular units comprises at least one modular unit;
means for determining a set of information items, wherein each information item individually relates to a specific modular unit in the first and second sets; wherein the set of information items represents competition-related information of connected modular units during the competition, wherein the set of information items comprises connection-related information indicating relative physical locations of each of said connected modular units relative to each other of said connected modular units;
creating a common game space including the determined set of information items based on the indication of the relative physical locations of each of said connected modular units relative to each other of said connected modular units such that the relative physical locations between the connected modular units defines a game space including a size and shape of a play field and thereby which competition is first performed; and
means for presenting one of the information items during the competition.

8. The computer system as claimed in claim 7, wherein the competition related information includes a physical layout of the common game space during the competition.

9. The computer system as claimed in claim 7, wherein the competition related information includes a physical layout of players within the common game space during the competition.

10. A computer-executable code stored on a computer-readable non-transitory medium for performing a competition between teams by means of at least two sets of modular units, the code when executed by a computer, executes acts of:
connecting a first set of modular units to a second set of modular units, wherein each set of modular units comprises at least one modular unit;
determining for a set of information items at least one modular unit,
wherein each information item individually relates to a specific modular unit in the first and second sets,
wherein the set of information items represents competition-related information of connected modular units during the competition, wherein the set of information items comprises connection-related information indicating relative physical locations of each of said connected modular units relative to each other of said connected modular units;
creating a common playfield including the determined set of information items based on the indication of the relative physical locations of each of said connected modular units relative to each other of said connected modular units such that the relative physical locations between the connected modular units defines a game space including a size and shape of a play field and thereby which competition is first performed; and
presenting the set of information items on the connected modular units during the competition.

11. The computer-executable code as claimed in claim 10, wherein the competition related information includes a physical layout of the common game space during the competition.

12. The computer-executable code as claimed in claim 10, wherein the indication of which ones of the plurality of ports of the first set of modular units are connected to which ones of the plurality of ports of the second set of modular units determines a physical layout of players within the common game space during the competition.

13. A modular unit for performing a competition between teams by means of at least two sets of modular units, the modular unit comprising:
means for connecting a first set of modular units to a second set of modular units, wherein each set of modular units comprises at least one modular unit;
means for determining a set of information items, wherein each information item individually relates to a specific modular unit in the first and second sets, wherein the set of information items represents competition-related information of connected modular units during the competition, wherein the determined set of information items comprises connection-related information indicating relative physical locations of each of said connected modular units relative to each other of said connected modular units;
creating a common game space including the determined set of information items based on the indication of the relative physical locations of each of said connected modular units relative to each other of said connected modular units such that the relative physical locations between the connected modular units defines a game space including a size and shape of a play field and thereby which competition is first performed;
means for distributing the set of information items to the corresponding connected modular units in the first and second sets; and
means for presenting one of the information items during the competition.

14. The modular unit as claimed in claim 13, further comprising:
means for receiving a first information item representing a property of a connected modular unit; and means for setting a competition-related information item of the connected modular units during the competition based on the received first information item.

15. The modular unit according to claim 13, further comprising:
means for receiving a second information item representing a second competition; and
means setting a competition-related information item based on the received second information item.

16. The modular unit as claimed in claim 13, wherein the competition related information includes a physical layout of the common game space during the competition.

17. The modular unit as claimed in claim 13, wherein the competition related information includes a physical layout of players within the common game space during the competition.

18. The modular unit as claimed in claim 13, wherein competition related information includes an allocation of competition related information during the competition.

19. The modular unit as claimed in claim 13, wherein a cumulative physical layout of the connected modular units determines a layout of virtual players during the competition.

20. A modular unit for performing a competition between teams by means of at least two sets of modular units, the modular unit comprising:
means for connecting a first set of modular units to a second set of modular units, wherein each set of modular units comprises at least one modular unit;
means for determining which modular unit is connected to which second modular unit or units in the first and the second set;
means for determining a set of information items, wherein each information item individually relates to a specific modular unit in the first and second sets, wherein the set of information items represents competition-related information of connected modular units during the competition, wherein the set of information items comprises connection-related information indicating physical locations of the connected modular units relative to one another as interconnected in the first and second sets in a common game space, and wherein the competition-related information during the competition depends on the physical locations of the connected modular units relative to each another and defines the game space including a size and shape of a play field and thereby which competition is first performed;
means for distributing the set of information items to the corresponding connected modular units in the sets; and
means for presenting one of the information items during the competition.

* * * * *